July 15, 1969    M. JACOBSON    3,454,993
SNAP FASTENER ASSEMBLY
Filed Aug. 8, 1967
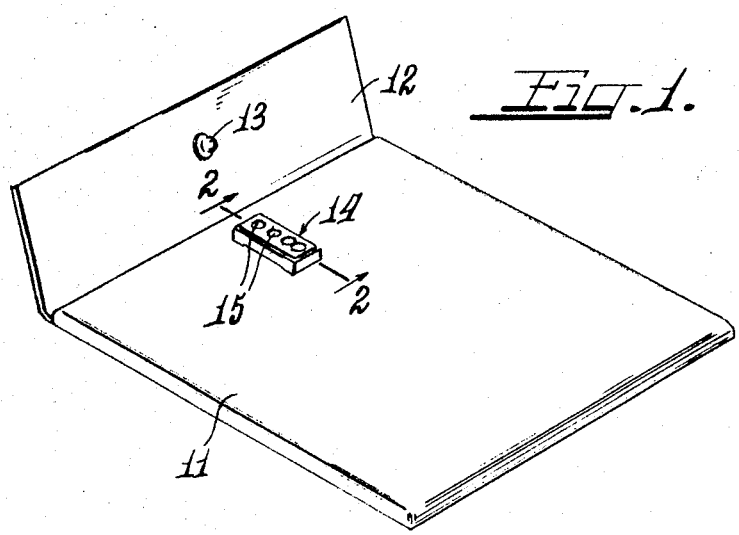
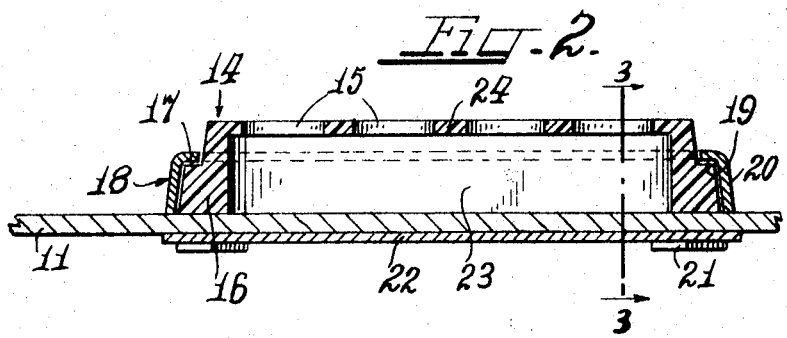
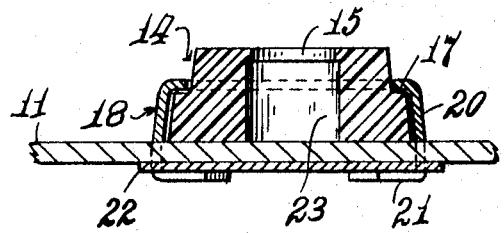
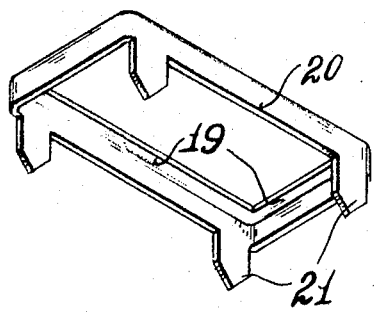
INVENTOR.
Martin Jacobson
BY Elmer L. Zwickel
Atty.

United States Patent Office 3,454,993
Patented July 15, 1969

3,454,993
SNAP FASTENER ASSEMBLY
Martin Jacobson, Providence, R.I., assignor to Rau Findings Company, Providence, R.I., a corporation of Rhode Island
Filed Aug. 8, 1967, Ser. No. 659,064
Int. Cl. A44b *17/00;* A45c *11/18*
U.S. Cl. 24—217      4 Claims

ABSTRACT OF THE DISCLOSURE

A female snap fastener assembly comprised of a body having stud sockets therein and a retaining frame characterized by the presence of integral attaching prongs thereon.

---

This invention relates to improvements in fasteners and is more particularly concerned with the novel construction and assembly of a female snap fastener having a plurality of sockets to selectively receive a male snap fastener element. The invention resides generally in the novel construction of a frame utilized to secure the female fastener element to the wall of, for example, a billfold, card case, purse or the like.

Heretofore female fastener elements of known construction are secured to a billfold, or the like, by means of a frame having laterally projecting integral perimeter flanges that are arranged between two layers of the billfold material such, for example, as is disclosed in Meyer Patent No. 3,301,296, dated Jan. 31, 1967. Such a mounting has the disadvantage of requiring costly assembly practices and undue rigidity is imparted to the wall in which it is mounted because of the presence of the flange. Further, such assembly can only be mounted as a step in the manufacture of the billfold.

In the present structure the female fastener element is comprised of a one-piece substantially rectangular body, preferably of plastic material, having a row of stud receiving openings therein. It is secured to the wall of a billfold or like article by a novel rectangular frame that telescopes over said body and is secured to the billfold or like article by means of integral prongs that are passed through the material of the billfold wall and clinched on the back side thereof. This materially reduces assembly costs over prior known practices and permits attachment of the element on an otherwise completed billfold. The assembly is such as to adapt the fastener for use irrespective of the ultimate thickness of the billfold resulting from the volume of its contents.

It is therefore an object of the invention to provide a fastener device of the character referred to.

Another object is to provide novel means for securing a snap fastener element to a surface.

Another object is to provide a novelly constructed frame structure for securing an element to a surface.

Another object is to provide novel means for securing a multiple socket element to a surface.

Another object is to provide an assembly of the character referred to which is not expensive to manufacture, may be attached to a wall surface easily and quickly and which is very efficient in use.

The structure by means of which the above noted and other objects and advantages of the invention are attained will be described in the following specification, taken in conjunction with the accompanying drawings, showing a preferred illustrative embodiment of the invention, in which:

FIG. 1 is a perspective view of a billfold embodying the invention;

FIG. 2 is a longitudinal sectional view taken substantially on line 2—2 of FIG. 1;

FIG. 3 is a transverse sectional view taken on line 3—3 of FIG. 2; and

FIG. 4 is a perspective view of the frame.

Referring to the exemplary disclosure of the invention as shown in the accompanying drawings, the assembly is shown mounted on a billfold formed of suitable sheet material, such as leather, plastic or the like. Although a billfold is depicted for purposes of illustration, it should be evident that the invention can be embodied in card cases, purses, or other containers of a type having a body wall and a flap for closing an opening into the interior of the container.

As shown, the billfold includes a wall 11 which may comprise single or multiple thicknesses of sheet material and a closure flap 12. The flap 12 carries a snap fastener stud element 13 whereas the wall 11 carries a snap fastener socket element assembly 14. Owing to the fact that the overall thickness of the billfold increases as material is added to its contents, the socket element is formed with a row of individual sockets 15 any one of which may be engaged by the stud element 13.

The snap fastener socket element is comprised of a substantially rectangular body 16 of suitable plastic material, any material having the requisite resiliency may be used. Said body is formed on all of its edges or sides with upwardly facing shoulders 17. This body is seated upon the surface of wall 11 and is secured thereto by a novel retaining frame 18. The frame 18, best shown in FIG. 4, is comprised of sheet metal and it is formed with an internal downwardly facing shoulder or lip 19 adapted, when assembled over the body 16, to seat upon body shoulders 17 and prevent the body from moving upwardly through the frame. The frame is formed at the base of its side walls 20 with a series of piercing prongs 21 that are projected through the billfold wall 11 and are clinched over the under side thereof. If desired or advisable an anvil plate 22 may be fitted over the projecting ends of the prongs before they are clinched.

The structural assembly is such that the socket element and frame can be secured over the outside surface of the billfold wall after the billfold has been otherwise completely fabricated. It functions to receive the stud element in a plurality of positions determined by the overall thickness of the billfold contents. Each of the sockets 15 preferably is formed by providing in the bottom face of body 16 an elongated recess 23 of such depth as to leave a thin web 24 on its front face in which a plurality of holes are provided. These holes constitute the sockets 15 which have a diameter slightly less than the largest effective diameter of the stud element 13 so as to provide a snap fit engagement between the two.

Although I have described a preferred embodiment of the invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. A female snap fastener assembly for attachment to a support surface comprising, in combination, a substantially flat rectangular resilient female socket body having side and end walls and a perforated top surface, said body being of a greater length and width at its bottom surface to define upwardly facing shoulders on its side and end walls spaced below the top surface, a sheet metal frame having a rectangular opening therein nested over said body and against the shoulders in such manner that the top portion of the body projects upwardly through the opening in the frame, and a plurality of bendable prongs on the base edge of said frame for piercing the support surface to retain the assembly on said surface, said support surface and prongs underlying othe body to retain it in said frame.

2. The assembly recited in claim 1, in which the body has an elongated recess in its bottom face and a thin web on its top face bridging the recess, said web having the perforations therein to receive a snap fastener stud therein.

3. The assembly recited in claim 1, in which the apertures in the body top surface constitute sockets to receive a complemental stud element.

4. The assembly recited in claim 1, in which the frame is fabricated from thin sheet metal and includes an internal flange on its top end defining the opening therein.

References Cited

UNITED STATES PATENTS

| 441,693 | 12/1890 | McElroy. | |
| 479,975 | 8/1892 | Denis | 24—217 XR |
| 1,208,601 | 12/1916 | Manahan | 24—217 |
| 3,270,386 | 9/1966 | Shears | 24—217 |
| 3,301,296 | 1/1967 | Meyer | 150—39 |

DONALD A. GRIFFIN, Primary Examiner

U.S. Cl. X.R.

150—39